(12) United States Patent
Giovannetti et al.

(10) Patent No.: US 11,033,959 B2
(45) Date of Patent: Jun. 15, 2021

(54) METHOD FOR MANUFACTURING MACHINE COMPONENTS BY ADDITIVE MANUFACTURING

(71) Applicant: NUOVO PIGNONE SRL, Florence (IT)

(72) Inventors: Iacopo Giovannetti, Florence (IT); Pierluigi Tozzi, Florence (IT); Massimo Giannozzi, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 238 days.

(21) Appl. No.: 15/327,645

(22) PCT Filed: Jul. 20, 2015

(86) PCT No.: PCT/EP2015/066550
§ 371 (c)(1),
(2) Date: Jan. 19, 2017

(87) PCT Pub. No.: WO2016/012399
PCT Pub. Date: Jan. 28, 2016

(65) Prior Publication Data
US 2017/0209923 A1 Jul. 27, 2017

(30) Foreign Application Priority Data

Jul. 21, 2014 (IT) ............... FI2014A000175

(51) Int. Cl.
*B22F 10/20* (2021.01)
*B33Y 10/00* (2015.01)
(Continued)

(52) U.S. Cl.
CPC .............. *B22F 1/0018* (2013.01); *B22F 3/15* (2013.01); *B22F 3/24* (2013.01); *B22F 10/20* (2021.01);
(Continued)

(58) Field of Classification Search
CPC ...... B22F 1/0018; B22F 1/0022; B22F 3/008; B22F 3/1055; B22F 3/15; B22F 3/156;
(Continued)

(56) References Cited

U.S. PATENT DOCUMENTS 3,070,439 A * 12/1962 Grant ..................... C22C 32/00
419/19
5,302,181 A 4/1994 Morichika
(Continued)

FOREIGN PATENT DOCUMENTS

CN 103045914 A * 4/2013
CN 103045914 A 4/2013
(Continued)

OTHER PUBLICATIONS

"Glossary of Metallurgical and Metalworking Terms," Metals Handbook, ASM Handbooks Online, ASM International, 2002, pp. 1, 228, 257. (Year: 2002).*
(Continued)

*Primary Examiner* — Vanessa T. Luk
(74) *Attorney, Agent, or Firm* — Baker Hughes Patent Organization (57) ABSTRACT

A method for manufacturing a machine component made of metal-based material is described. The method comprises the steps of: providing a powder blend comprising at least one metal-containing powder material and at least one strengthening dispersor in powder form, wherein the strengthening dispersor in powder form has an average grain size less than an average grain size of the metal-containing powder material; and forming the machine component by an additive manufacturing process using the powder blend.

13 Claims, 3 Drawing Sheets

(51) Int. Cl.
*B22F 1/00* (2006.01)
*C22C 32/00* (2006.01)
*B33Y 40/00* (2020.01)
*B33Y 70/00* (2020.01)
*B33Y 80/00* (2015.01)
*B23K 26/342* (2014.01)
*B23K 26/70* (2014.01)
*B22F 3/15* (2006.01)
*B22F 3/24* (2006.01)
*B23K 26/00* (2014.01)
*C22C 19/05* (2006.01)
*C22C 19/07* (2006.01)
*C22C 27/02* (2006.01)
*C22C 27/04* (2006.01)
*B23K 101/00* (2006.01)
*B23K 103/02* (2006.01)
*B23K 103/08* (2006.01)
*F01D 5/28* (2006.01)
*F01D 9/02* (2006.01)

(52) U.S. Cl.
CPC ........ *B23K 26/0006* (2013.01); *B23K 26/342* (2015.10); *B23K 26/70* (2015.10); *B33Y 10/00* (2014.12); *B33Y 40/00* (2014.12); *B33Y 70/00* (2014.12); *B33Y 80/00* (2014.12); *C22C 19/056* (2013.01); *C22C 19/057* (2013.01); *C22C 19/07* (2013.01); *C22C 27/02* (2013.01); *C22C 27/04* (2013.01); *C22C 32/001* (2013.01); *C22C 32/0005* (2013.01); *B22F 2003/248* (2013.01); *B22F 2302/45* (2013.01); *B23K 2101/001* (2018.08); *B23K 2103/02* (2018.08); *B23K 2103/08* (2018.08); *F01D 5/28* (2013.01); *F01D 9/02* (2013.01); *F05D 2230/22* (2013.01); *F05D 2230/233* (2013.01); *F05D 2230/234* (2013.01); *F05D 2300/175* (2013.01); *Y02P 10/25* (2015.11)

(58) Field of Classification Search
CPC ................ B22F 3/24; B22F 2003/1056; B22F 2003/1057; B22F 2003/1058; B22F 2003/1059; B22F 2003/153; B22F 2003/248; B22F 5/009; B22F 5/04; B22F 3/105; B22F 2003/1051; B22F 2003/1052; B22F 2003/1053; B22F 2003/1054; C22C 1/0043; C22C 1/045; C22C 1/0458; C22C 1/05; C22C 1/051; C22C 1/10; C22C 1/1042; C22C 1/1068; C22C 27/02; C22C 27/04; B33Y 10/00; B33Y 40/00; B33Y 40/10; B33Y 40/20; B33Y 70/00; B33Y 70/10
See application file for complete search history.

(56) References Cited

U.S. PATENT DOCUMENTS

| | | | | | |
|---|---|---|---|---|---|
| 5,589,652 | A * | 12/1996 | Arato | ..................... | B22F 1/0007 419/12 |
| 2003/0010409 | A1 * | 1/2003 | Kunze | ................... | B22F 3/1055 148/513 |
| 2003/0059331 | A1 * | 3/2003 | Shinkai | ................. | B22F 3/1112 419/5 |
| 2009/0183850 | A1 * | 7/2009 | Morrison | ................ | B22F 5/009 164/91 |
| 2013/0228302 | A1 * | 9/2013 | Rickenbacher | ....... | C22C 19/056 164/492 |
| 2014/0053956 | A1 | 2/2014 | Etter | | |
| 2015/0093279 | A1 * | 4/2015 | Kington | ................ | B22F 3/1055 419/19 |
| 2015/0298212 | A1 * | 10/2015 | Hann | ..................... | C22C 32/00 419/12 |
| 2016/0158839 | A1 * | 6/2016 | Piascik | ................. | C22C 1/1084 75/352 |
| 2016/0175929 | A1 * | 6/2016 | Colin | .................... | B22F 1/0048 419/23 |

FOREIGN PATENT DOCUMENTS

| | | | | |
|---|---|---|---|---|
| CN | 103695681 | A | 4/2014 | |
| EP | 2 586 887 | A1 | 5/2013 | |
| FR | 2979269 | A1 * | 3/2013 | ............ B22F 3/1055 |
| GB | 2486046 | A | 6/2012 | |
| JP | 03264603 | A | 11/1991 | |
| JP | H04325651 | A | 11/1992 | |
| JP | 0649581 | A | 2/1994 | |
| JP | 10245642 | A | 9/1998 | |
| JP | H1161303 | A | 3/1999 | |
| JP | 2014040663 | A | 3/2014 | |
| RU | 2 342 222 | C2 | 12/2008 | |
| WO | 01/45882 | A2 | 6/2001 | |

OTHER PUBLICATIONS

Bhadeshia, H.K.D.H., "Recrystallisation of Practical Mechanically Alloyed Iron-Base and Nickel-Base Superalloys," Materials Science and Engineering, vol. 223, Issue 1-2, Feb. 28, 1997, pp. 64-77.
Boegelein, T. et al., "Mechanical Response and Deformation Mechanisms of Ferritic Oxide Dispersion Strengthened Steel Structures Produced by Selective Laser Melting," Acta Materialia, vol. 87, Apr. 1, 2015, pp. 201-215 (Abstract).
Bozon-Verduraz, F. et al., "Nanoparticles of metal and metal oxides: some peculiar synthesis methods, size and shape control, application to catalysts preparation," Brazilian Journal of Physics, vol. 39, No. 1A, Apr. 2009, pp. 134-140.
Elzey, D.M. and Arzt, E., "Oxide Dispersion Strengthened Superalloys: The Role of Grain Structure and Dispersion During High Temperature Low Cycle Fatigue," Superalloys 1988, Edited by S. Reichman, D.N. Duhl, G. Maurer, S. Antolovich and C. Lund, The Metallurgical Society, 1988, pp. 595-604.
Lorke, A. et al. (eds.), "Nanoparticles from the Gas Phase," NanoScience and Technology, © Springer-Verlag Berlin Heidelberg 2012, Chapter 2, pp. 49-76.
Murty, B.S. and Ranganathan, S. "Novel Materials Synthesis by Mechanical Alloying/Milling," International Materials Reviews, vol. 43, Issue 3, 1998, pp. 101-141.
Raab, C. et al., "Production of Nanopartiles and Nanomaterials,"NanoTrust Dossiers, No. 6, Feb. 2011, pp. 1-4.
Tsuzuki, T. Commercial Scale Production of Inorganic Nanoparticles, International Journal of Nanotechnology, vol. 6, Issue 5, Apr. 2009, pp. 567-578.
Suryanarayana, C. et al., "The Science and Technology of Mechanical Alloying," Materials Science and Engineering: A, vol. 304-306, May 31, 2001, pp. 151-158.
Walker, J.C. et al., "Fabrication of Fe—Cr—Al Oxide Dispersion Strengthened PM2000 Alloy Using Selective Laser Melting," Advanced Engineering Materials, vol. 11, No. 7, Jul. 2009, pp. 541-546.
Italian Search Report and Written Opinion issued in connection with corresponding IT Application No. ITFI2014A000175 dated Apr. 24, 2015.
International Invitation to Pay Additional Fees issued in connection with corresponding IT Application No. PCT/EP2015/066550 dated Oct. 12, 2015.
International Search Report and Written Opinion issued in connection with corresponding PCT Application No. PCT/EP2015/066550 dated Dec. 11, 2015.
International Preliminary Report on Patentability issued in connection with corresponding PCT Application No. PCT/EP2015/066550 dated Feb. 2, 2017.
Office Action and Search issued in connection with corresponding RU Application No. 2017100652 dated Nov. 30, 2018 (English translation not available).

(56) References Cited

OTHER PUBLICATIONS

"Metal Materials and Machinery Manufacturing Process", Ren Changchun, et al., pp. 55-58, Higher Education Press, Mar. 2012.

* cited by examiner

METHOD FOR MANUFACTURING MACHINE COMPONENTS BY ADDITIVE MANUFACTURING

BACKGROUND

The present disclosure relates to the manufacturing of machine components, in particular machine components which are subject to high temperature operating conditions, such as components of internal combustion engines and turbomachines, e.g. but not limited to gas turbines. More specifically, exemplary embodiments of the subject matter disclosed herein relate to the manufacturing of turbomachine components using high-temperature superalloy-based materials, such as but not limited to turbine rotary and stationary blades or buckles, turbine nozzles, turbine impellers.

Use of Oxide Dispersion Strengthened (ODS) superalloys as suitable materials for manufacturing machine components subject to high temperature fatigue cycles is known (D. M. Elzey et al, "*Oxide Dispersion Strengthened Superalloys: the Role of Grain Structure and Dispersion During High Temperature Low Cycle Fatigue*", published in Superalloys 1988, The Metallurgical Society, 1988, pages 595-604). These materials are usually produced by mechanical alloying (H. K. D. H. Bhadeshia "*Recrystallisation of Practical Mechanically Alloyed Iron-Base and Nickel-Base Superalloys*", published in Materials Science and Engineering A223 (1997) 64-77; C. Suryanarayana et al "The Science and Technology of Mechanical Alloying", in Materials Science and Engineering A304-306 (2001) 151-158; B. S. Murty et al. "*Novel Materials Synthesis by Mechanical Alloying/Milling*", published in International Materials Reviews, 1998, Vol. 43, N. 3, pages 101-141).

Alloys obtained by mechanical alloying are usually available in the form of extruded blanks. Powder manufactured from blanks of ODS superalloys generated by mechanical alloying are used for the manufacturing of components by sintering processes. These latter require a mold, which has a shape corresponding to the negative of the shape of the final article of manufacture to be produced. Sintering is an expensive and non-flexible manufacturing process.

EP 2586887 discloses processes for manufacturing turbine blades by additive manufacturing, e.g. using Laser Metal forming, Electron Beam Melting and other additive manufacturing processes. High-temperature superalloys such as Ni-based superalloys in powder form are suggested by this prior art document. In some embodiments disclosed herein, the high-temperature superalloy powder contains dispersed oxides. The above mentioned publication does not provide any teaching on how oxides are introduced in the superalloy powder material, nor is any weight composition or other detail given, as far as the oxides are concerned.

Additive manufacturing processes are a category of inexpensive, flexible and efficient manufacturing methods, whereby machine components of complex shape can be easily produced at low cost. Use of additive manufacturing processes may be highly desirable for the production of turbomachine components, which must satisfy stringent requirements as far as mechanical resistance under heavy operating conditions are concerned, such as high temperature creep resistance under fatigue conditions, for instance.

BRIEF DESCRIPTION

In one embodiment, a method for manufacturing a machine component made of metal-based material is disclosed, the method comprising the following steps: providing a powder blend comprising at least one metal-containing powder material and at least one strengthening dispersor in powder form, wherein the strengthening dispersor in powder form has an average grain size less than an average grain size of the metal-containing powder material; and forming the component by an additive manufacturing process using the powder blend.

In the context of the present specification and attached claims, the term "metal" also includes refractory elements, or refractory metal. A "metal-containing powder material" thus includes also a powder material containing a refractory metal or element. Suitable refractory elements or metals include, but are not limited to, Mo, W, Ta, Nb and combinations thereof. A metal-based material includes a material comprised of a metal, including a refractory metal, as well as an intermetallic compound, such as an aluminide or silicide, as will be described in greater detail here below, reference being made to exemplary embodiments of the subject matter disclosed herein.

In the context of the present specification and attached claims, a "strengthening dispersor" is a compound which, when dispersed in the powder blend and then in the final manufactured component, increases the strength thereof in particular to high-temperature creep.

According to some embodiments, the metal-containing powder material can be a metal powder. For instance the metal powder can be a superalloy-based metal powder, e.g. a high-temperature superalloy powder. According to other embodiments, the metal-containing powder material is an intermetallic powder material, i.e. an intermetallic compound in powder form, for instance an aluminide. In some embodiments, the metal-containing powder material can be a silicide. A combination of two or more metal-containing compounds in powder form can also be envisaged.

The strengthening dispersor in powder form can be or comprised of at least one ceramic material in powder form. In some embodiments, the ceramic material can be an oxide. Two or more strengthening dispersors can be used. In some embodiments, a ceramic material not containing oxygen may be used. For instance, if the metal-containing powder material is Mo-based or Nb-based, a ceramic material not containing oxygen atoms may be used, since a higher resistance to high-temperature oxidation is obtained.

The strengthening dispersor in powder form in the powder blend used for additive manufacturing will generate a dispersion in the final solidified component, which increases creep resistance of the component.

By providing a blend of metal-containing material in powder form and a strengthening dispersor in powder form, the grain size distribution (granulometry) of both blend components can be carefully controlled, such that an optimal average granulometry can be used for both blend components. Specifically, the metal-containing powder material can have an average grain size selected for achieving optimum melting and solidification during additive manufacturing. The strengthening dispersor in powder form, e.g. ceramic material in powder form, can have an average grain size selected so as to improve the creep resistance achieved in the final machine component, without adversely affecting fragility thereof.

Additive manufacturing under controlled atmosphere, e.g. using inert gas, or under vacuum conditions, prevents chemical alteration of the strengthening dispersor. Moreover, the layer-by-layer process, which characterizes additive manufacturing prevents the strengthening dispersor, for instance an oxide or other ceramic material, from separating by floating on top of the melted metal, such that a substantially uniform distribution of the strengthening dispersor in the final article of manufacture can be achieved.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The modifier "about" used in connection with a quantity is inclusive of the stated value and has the meaning dictated by the context (e.g., includes the tolerance ranges associated with measurement of the particular quantity).

In the following description reference will be made to manufacturing of turbomachine components. It shall however be understood that the methods disclosed herein can be applied also to the manufacturing of other machine components, in particular machine components, which are subject to high temperature operating conditions and to fatigue cycles, e.g. components of reciprocating internal combustion engines.

Figure 1:
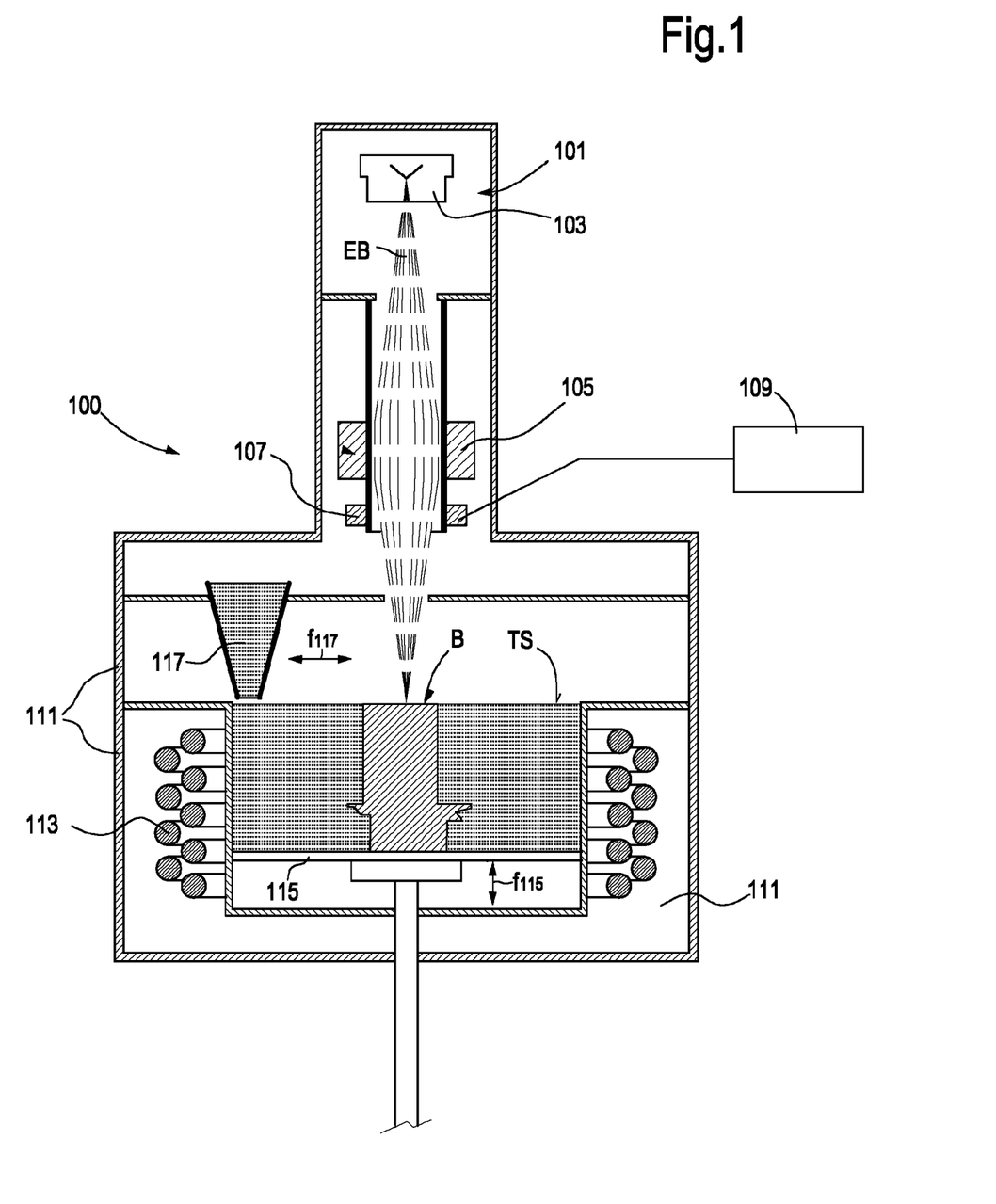
FIG. 1 illustrates a schematic of an additive manufacturing device using electron beam melting technology, for manufacturing a machine component.

FIG. 1 is a schematic of an exemplary additive manufacturing machine or device, which can be used for manufacturing a turbomachine component, such as a turbine blade B, a turbine nozzle, a turbine shroud or other turbine components, according to methods of the present disclosure.

As known to those skilled in the art, additive manufacturing is a process wherein an article having a complex shape is manufactured layer-by-layer starting from a powder material, which is locally melted using an energy source. In the embodiment of FIG. 1, the energy source is an electron beam gun. In other embodiments, the energy source can be a laser.

The additive manufacturing machine of FIG. 1 is designated 100 as a whole. The structure and operation of additive manufacturing machines are known per se and will not be described in great detail herein. In short, the additive manufacturing machine 100 of FIG. 1 includes an energy source, which in the exemplary embodiment disclosed herein includes an electron-beam gun 101 comprising an electron emitter 103, which generates an electron beam EB. The electron beam EB is directed towards a target surface TS, arranged under the electron-beam gun 101. Along the electron-beam path a focusing coil 105 and a deflection coil 107 can be arranged. The focusing coil 105 focuses the electron beam on the target surface TS and the deflection coil 107 controls the movement of the electron beam EB along a pattern, according to which a powder material has to be melted and solidified. A computer device 109 controls the deflection coil 107 and the movement of the electron beam EB. The movement of the electron beam EB is controlled by the computer device 109 based on data from a file representing the three-dimensional product to be manufactured.

Under the energy source 101 a confinement structure 111 can be arranged. The confinement structure 111 can be combined with a temperature control means, for example comprising a heater shown schematically at 113, e.g. an electrical heater. A movable table 115 can be arranged in the confinement structure 111. The movable table 115 can be controlled to move vertically according to double arrow f115. The vertical movement of the movable table 115 can be controlled by the computer device 109. A powder material container 117 can be arranged above the target surface TS and is controlled to move horizontally according to double arrow f117, for example under the control of the computer device 109.

The additive manufacturing process performed by the additive manufacturing machine 100 can be summarized as follows. A first layer of powder material from the powder material container 117 is distributed on the movable table 115 by moving the powder material container 117 according to arrow f117 one or more times along the movable table 115, which is placed at the height of the target surface TS. Once the first layer of powder material has been distributed, the electron-beam gun 101 is activated and the electron beam EB is controlled by the deflection coil 107 such as to locally melt the powder material in a restricted portion of the layer, corresponding to a cross-section of the product to be manufactured. After melting, the melted powder material is allowed to cool and solidify. Powder material outside the boundaries of the cross-section of the product to be manufactured remains in powder form.

Once the first layer has been processed as described above, the movable table 115 is lowered and a subsequent layer of powder material is distributed on top of the first, solidified layer. The second layer of powder material is in turn selectively melted and subsequently allowed to cool and solidify. Melting and solidifying are performed such that each layer portion will adhere to the previously formed layer portion. The process is repeated stepwise, until the entire product is formed, by subsequently adding one powder material layer after the other and selectively melting and solidifying layer portions corresponding to subsequent cross sections of the product.

Once the product has been completed, the powder material which has not been melted and solidified can be removed and recycled.

The above described process can be carried out under controlled temperature conditions by means of the heater 113. The temperature within the confinement structure 111 is controlled such that the entire process is performed at high temperature and virtually no residual stresses remain in the product at the completion of the manufacturing cycle. After the construction process has been completed, the product can be allowed to cool down from a processing temperature to an environment temperature following a cooling curve, which prevents residual stresses in the final product.

In an embodiment, the interior of the confinement structure 111 is maintained under hard vacuum conditions, such that oxygen absorption by the powder material and the melted material is prevented.

Figure 2:
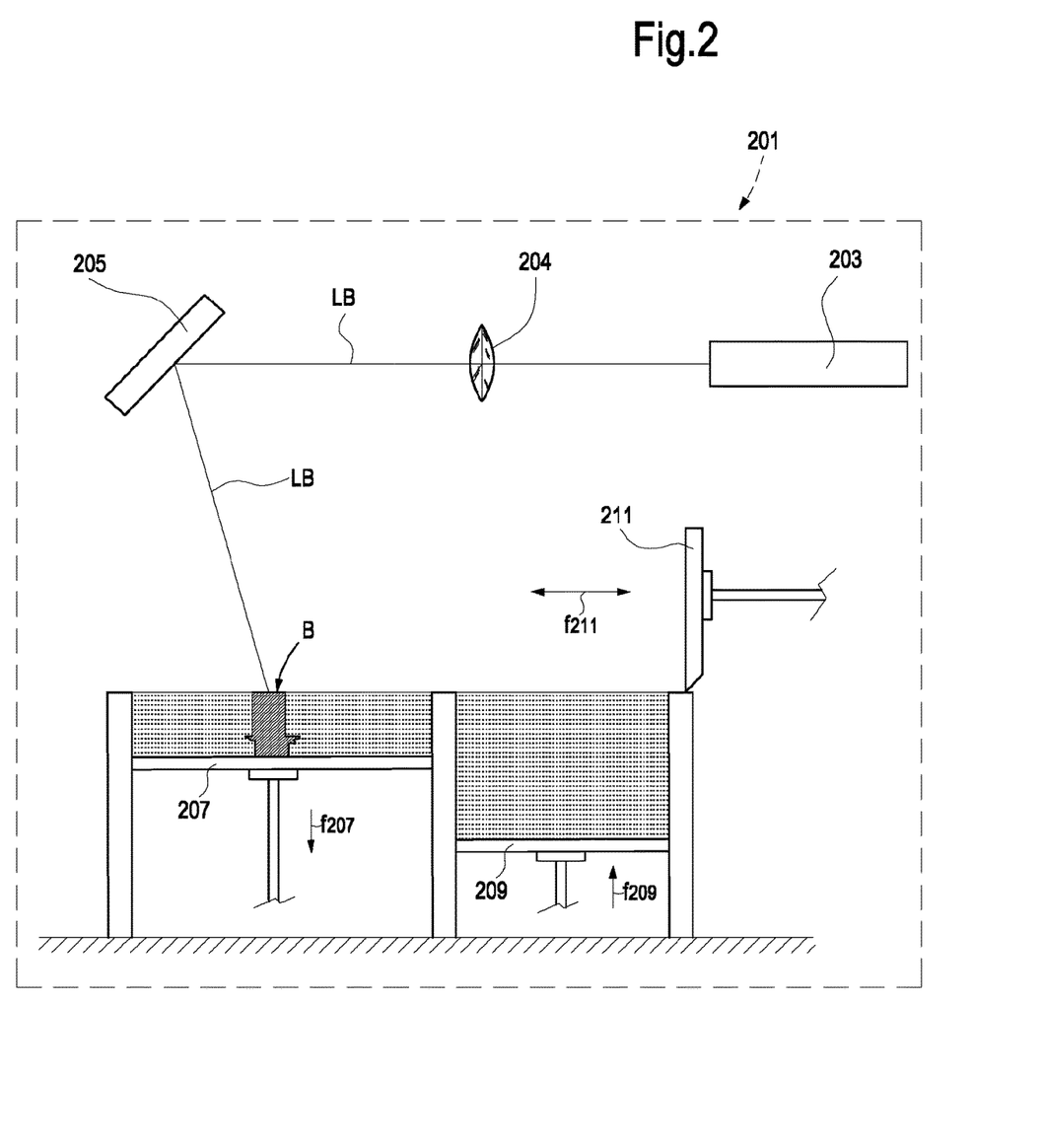
FIG. 2 illustrates a schematic of direct metal laser melting device for additive manufacturing.
Figure 3:
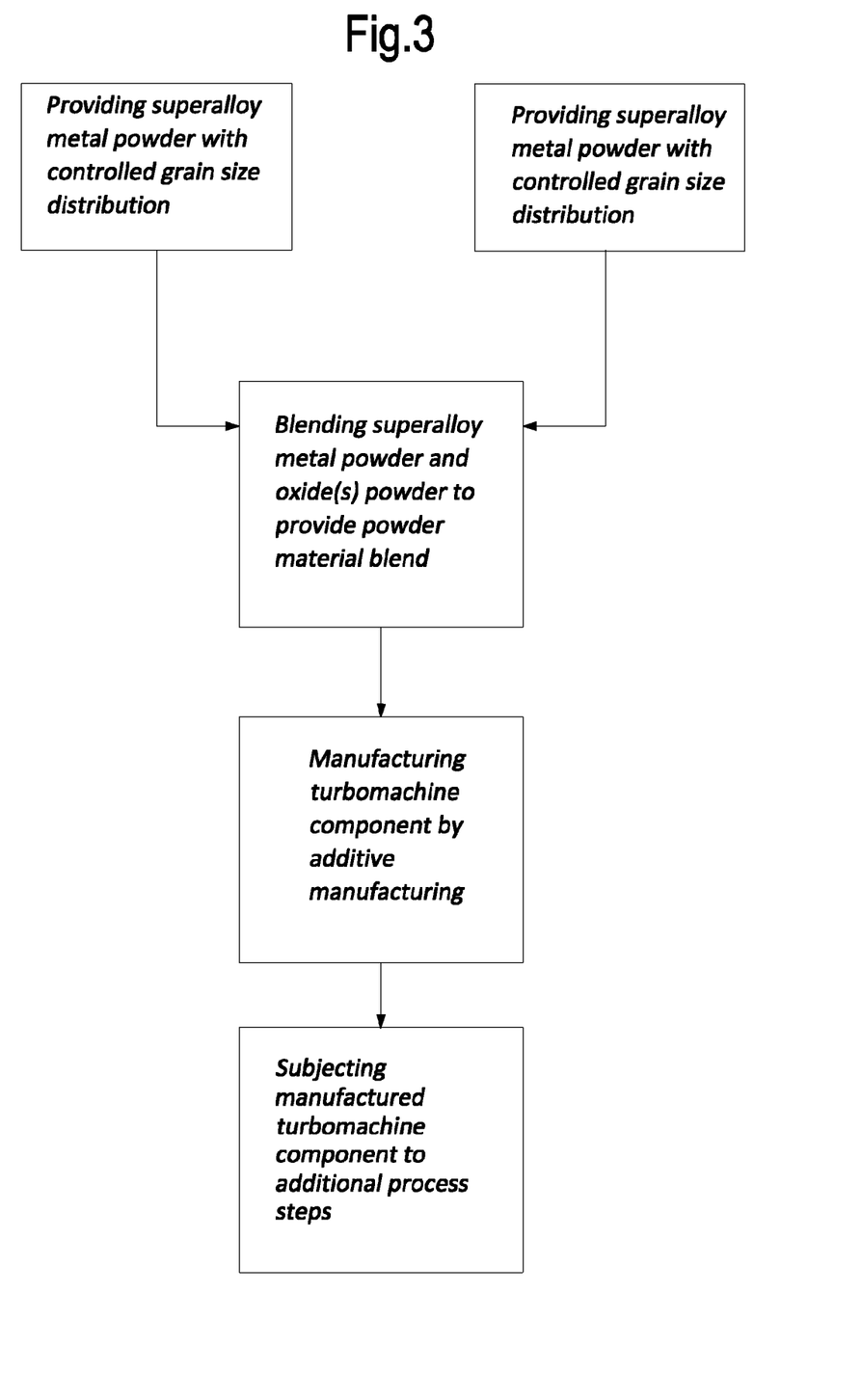
FIG. 3 illustrates a flow diagram of methods according to the present disclosure.

FIG. 2 illustrates a schematic of a DMLM (Direct Metal Laser Melting) device 201. The device includes a laser source 203, e.g. a carbon dioxide laser. The laser beam LB generated by the laser source 203 is focused by optics 204 and can be deflected by mirrors 205. The mirrors 205 are controlled by a programmable control unit, not shown, to follow a pattern which corresponds to the cross-section of each layer of the article to be manufactured, e.g. a turbine blade. A first vertically movable table 207 supports the workpiece or article B during manufacturing. A second vertically movable table 209 forms the bottom of a powder material container. A horizontally movable wiper blade 211 distributes powder material from the powder material container on top of the workpiece B being manufactured. The table 207 and the table 209 can be housed in a vacuumized container, or in a container filled with inert gas, e.g. argon.

The additive manufacturing process performed by device 201 is known per se and can be summarized as follows. The table 207 is moved in the upper position and a first layer of powder material is uniformly distributed on the table 207 by the wiper blade 211. The laser source 203 is activated and the laser beam LB is controlled so as to locally and selectively melt the powder material of the layer on table 207. The table 207 is then lowered (arrow f207) by a stroke corresponding to the thickness of the subsequent layer. The first layer of melted material is allowed to solidify. The table 209 is lifted (arrow f209) to make additional powder material available for the wiper blade 211. This latter performs a further reciprocating movement (arrow f211) to distribute the next powder material layer on top of the previous one on table 207 and the laser beam LB is activated and moved by mirrors 205 to selectively melt the powder material of the second layer.

The process is repeated until the final article is obtained.

In the schematic of FIG. 2 deflecting mirrors 205 are used. In other exemplary embodiments a fiber laser can be used, wherein the laser energy is conveyed by means of a fiber, the terminal end whereof is moved according to numerically controlled axes, e.g. X and Y axes, parallel to table 207.

According to embodiments disclosed herein, the powder material used in the additive manufacturing process is a powder blend comprised of at least two powder materials, namely a metal-containing powder and a strengthening dispersor in powder form. As mentioned above, the metal-containing powder can be an intermetallic or a metal powder, e.g. a superalloy, suitable for high temperature conditions of operation of the machine component formed thereby. The dispersor can be a ceramic material, such as, but not limited to, an oxide powder.

According to some exemplary embodiments, the metal-containing powder is a superalloy powder, such as a high temperature superalloy powder. The superalloy powder can be one of a Ni-based superalloy, Co-based superalloy, Fe-based superalloy, Mo-based superalloy, W-based superalloy; Ta-based superalloy; Nb-based superalloy. In other embodiments, the metal-containing powder material can be selected from the group consisting of $Nb_3Si$, $MoSi_2$, TaSi, MoSiNb or other silicides. In yet further embodiments, the metal-containing powder material can be an aluminide, such as NiAl or FeAl.

The metal-containing powder material can be obtained starting from an ingot or bar of a master superalloy, which is subsequently molten and atomized. According to some exemplary embodiments, the master superalloy ingot can be manufactured by vacuum induction melting.

According to some embodiments, atomization is achieved by vacuum inert gas atomization, which ensures the production of superalloy powder having a low oxygen content and spherical shape of the grains. The master superalloy ingot is melted and fed through a nozzle into an atomization chamber, wherein a pressurized jet of inert gas is directed against the melted metal flow, which is thus separated into a plurality of small metal particles.

The grain size of the powder obtained can be controlled by adjusting the gas/metal flow ratio in the atomization chamber.

According to other embodiments, the atomization of the starting ingot can be obtained by a process selected from the group consisting of Vacuum Induction Gas Atomization (VIGA), Plasma Rotating Electrode Process (PREP), Plasma Atomization (PA), Rotating Disc Atomization (RDA).

In an embodiment, a required granulometric distribution, i.e. grain dimension of the final atomized metal-containing powder material can be achieved e.g. by means of a cyclone classifier. In some embodiments, the granulometric distribution is selected such that the average grain size of the metal-containing powder material is comprised between about 10 micrometers and about 100 micrometers. In some exemplary embodiments, the average grain size is comprised between about 10 micrometers and about 60 micrometers.

As mentioned above, the powder blend further comprises at least one dispersor, e.g. a ceramic material, in powder form. In some embodiments, a single ceramic material in powder form can be used. In other embodiments a mixture of two or more different ceramic materials in powder form, having different chemical compositions, can be used. In some embodiments, the ceramic powder material is an oxide powder.

According to exemplary embodiments of the method disclosed herein, the at least one strengthening dispersor in powder form can a metal oxide. In some embodiments the strengthening oxide is selected from the group consisting of:

Y$_2$O$_3$, Al$_2$O$_3$, Th$_2$O$_4$, Zr$_2$O$_3$, La$_2$O$_3$, Yb$_2$O$_3$, Dy$_2$O$_3$, and combinations thereof. Other ceramic, non-oxide materials can be selected from the group consisting of: Si$_3$N$_4$, AlN, SiC, TaC, WC, and combinations thereof.

The strengthening dispersor in powder form can have an average grain size lower than the average grain size of the metal-containing powder material. In some embodiments the strengthening dispersor in powder form has an average grain size equal to or less than about 5 micrometers. In some embodiments, the strengthening dispersor in powder form can have an average grain size of about 1 micrometer or less, more particularly about 0.5 micrometers or less. In some embodiments the strengthening dispersor in powder form has a nanometric average grain size, for instance an average grain size equal to or less than about 60 nm, or else equal to or less than about 50 nm. In some embodiments the average grain size is not less than about 5 nm.

Nanometric dimensional strengthening dispersor can be obtained by known methods. Suitable methods are disclosed e.g. in A. Lorke et al. (eds.): *Nanoparticles from the Gas Phase*, NanoScience and Technology, Springer-Verlag Berlin Heidelberg 2012, Chapter 2; Christina Raab et al.: *Production of Nanopartiles and Nanomaterials*, in Nano-Trust Dossiers, n. 6, February 2011; Takuya Tsuzuki: *Commercial Scale Produton of Inorganic Nanoparticles*, in Int. J. Nanotechnol., vol. 6, nos 5/6 2009; Francois Bozon-Verduraz et al: *Nanoparticles of Metal and metal Oxides: Some Peculiar Synthesis Methods, Size and Shape Control, Application to Catalysts Preparation*", in Brazilian Journal of Physics, vol. 39, n. 1A, April 2009.

Combining coarser metal-containing material in powder form and finer strengthening dispersor in powder form, enhanced mechanical properties of the final component produced by additive manufacturing can be achieved. The small dispersor powder grains give raise to a fine distribution of the dispersor in the metallic matrix, reducing or preventing the risk of increasing the fragility of the final material.

The amount of strengthening dispersor in powder form in the final blend can range e.g. between about 0.01% and about 48% by weight. In some embodiments, strengthening dispersor powder is present in an amount ranging between about 0.1% and about 30% by weight, for instance between about 0.1% and about 2% by weight.

The following Table 1 provides a list of exemplary compositions of suitable powder blends. The superalloy metal component of the blend is a Ni-based superalloy. The composition is given in % by weight.

TABLE 1

| Ni | Co | W | Cr | Al | Ti | Ta | Re | Ru | Mo | Hf | C | B | Zr | Y$_2$O$_3$ <5 μm | Y$_2$O$_3$ <20 nm |
|---|---|---|---|---|---|---|---|---|---|---|---|---|---|---|---|
| Bal. | 9.10 | 9.40 | 8.01 | 5.54 | 0.69 | 3.16 | — | — | 0.49 | 1.38 | 0.07 | 0.01 | 0.01 | 1.10 | — |
| Bal. | 9.10 | 9.40 | 8.01 | 5.54 | 0.69 | 3.16 | — | — | 0.49 | 1.38 | 0.07 | 0.01 | 0.01 | — | 1.10 |
| Bal. | 9.15 | 9.45 | 8.06 | 5.57 | 0.70 | 3.18 | — | — | 0.50 | 1.39 | 0.07 | 0.01 | 0.01 | 0.55 | — |
| Bal. | 9.15 | 9.45 | 8.06 | 5.57 | 0.70 | 3.18 | — | — | 0.50 | 1.39 | 0.07 | 0.01 | 0.01 | — | 0.55 |
| Bal. | 5.54 | 4.95 | 4.55 | 5.54 | — | 5.54 | 6.33 | 4.95 | 2.37 | 0.10 | — | — | — | 1.10 | — |
| Bal. | 5.54 | 4.95 | 4.55 | 5.54 | — | 5.54 | 6.33 | 4.95 | 2.37 | 0.10 | — | — | — | — | 1.10 |
| Bal. | 5.57 | 4.97 | 4.57 | 5.57 | — | 5.57 | 6.36 | 4.97 | 2.39 | 0.10 | — | — | — | 0.55 | — |
| Bal. | 5.57 | 4.97 | 4.57 | 5.57 | — | 5.57 | 6.36 | 4.97 | 2.39 | 0.10 | — | — | — | — | 0.55 |

The following Table 2 lists additional exemplary embodiments of compositions, which can be used with the method disclosed herein. These compositions are comprised of Mo-based, Ni-based, W-based, Ta-based and Nb-based alloys.

TABLE 2

| Ni | Co | Cr | Mo | W | Ta | Re | Ru | Nb | Ti | Al | Fe | C | Hf | B | Zr | Si | Ceramic (e.g. Si$_3$N$_4$) and/or Oxide (e.g. Y$_2$O$_3$) |
|---|---|---|---|---|---|---|---|---|---|---|---|---|---|---|---|---|---|
| 10 | Bal. | 29 | — | 7 | — | — | — | — | — | — | 1 | 0.07 | — | 0.01 | — | — | 1 |
| Bal. | 8.5 | 16 | 1.75 | 2.6 | 1.75 | — | — | 0.9 | 3.4 | 3.4 | — | 0.05 | — | — | 0.1 | — | 1 |
| Bal. | 9.5 | 14 | 1.55 | 3.8 | 2.7 | — | — | 0.15 | 4.9 | 3 | 0.3 | 0.05 | — | 0.014 | 0.04 | 0.25 | 1 |
| Bal. | 9.5 | 8.4 | 0.5 | 9.5 | 3 | — | — | — | 0.75 | 5.5 | 0.2 | 0.05 | 1.5 | 0.015 | 0.013 | 0.06 | 1 |
| Bal. | 10 | 8.9 | 2 | 7 | 3.8 | 0.05 | — | 0.1 | 2.5 | 4.8 | 0.2 | 0.06 | 1.55 | 0.015 | 0.03 | 0.1 | 1 |
| Bal. | 7.5 | 9.8 | 1.5 | 6 | 4.8 | 0.1 | — | 1 | 3.5 | 4.25 | 0.2 | 0.06 | 0.15 | 0.004 | 0.01 | 0.2 | 1 |
| Bal. | 5 | 8 | 0.6 | 8 | 6 | — | — | — | 1 | 5.6 | — | — | — | — | — | — | 25 |
| Bal. | 5 | 10 | — | 4 | 12 | — | — | — | 1.5 | 5 | — | — | — | — | — | — | 1 |
| Bal. | 1 | 7.2 | 0.9 | 9 | 8.8 | 1.4 | — | 1 | — | 5 | — | 0.07 | 0.25 | 0.02 | — | — | 1 |
| Bal. | 7.5 | 7 | 1.5 | 5 | 6 | 1.5 | — | 0 | 0.05 | 6.2 | 0 | 0.05 | 0.15 | 0.004 | 0.01 | 0.2 | 1 |
| Bal. | 7.5 | 7 | 1.5 | 5 | 6 | 3 | — | 0.1 | 0.05 | 6.2 | 0.2 | 0.05 | 0.15 | 0.004 | 0.01 | 0.2 | 1 |
| Bal. | 9.6 | 6.4 | 0.6 | 6 | 6.6 | 2.9 | — | — | 1.03 | 5.64 | — | — | 0.1 | — | — | — | 1 |
| Bal. | 7.8 | 4.9 | 1.9 | 9 | 6 | 2.4 | — | — | 0.5 | 5.3 | — | — | 0.1 | — | — | — | 1 |
| Bal. | 10 | 5 | 1.9 | 5.9 | 8.7 | 3 | — | — | — | 5.6 | — | — | 0.1 | — | — | — | 8 |
| Bal. | 12.5 | 4.2 | 1.4 | 6 | 7.2 | 5.4 | — | — | — | 5.75 | — | 0.05 | 0.15 | 0.004 | | — | 1 |
| Bal. | 3 | 2 | 0.4 | 5 | 8 | 6 | — | 1 | 0.2 | 5.7 | — | — | 0.03 | — | — | — | 1 |
| Bal. | 12 | 3 | 2 | 6 | 6 | 5 | — | — | — | 6 | — | — | 0.1 | — | — | — | 10 |
| Bal. | 5.8 | 3.2 | 2.8 | 5.9 | 5.6 | 5 | 2 | — | — | 5.9 | — | — | 0.1 | — | — | — | 1 |
| Bal. | 5.8 | 3.2 | 2.8 | 5.6 | 5.6 | 5.8 | 3.6 | — | — | 5.7 | — | — | 0.1 | — | — | — | 1 |
| Bal. | 16.5 | 2 | 2 | 6 | 8.25 | 5.95 | 3 | — | — | 5.55 | — | 0.03 | 0.15 | — | — | — | 4 |
| Bal. | 5.3 | 4.4 | 2.3 | 4.8 | 5.3 | 6.1 | 4.8 | — | — | 5.7 | — | — | 0.1 | — | — | — | 1 |

TABLE 2-continued

| Ni | Co | Cr | Mo | W | Ta | Re | Ru | Nb | Ti | Al | Fe | C | Hf | B | Zr | Si | Ceramic (e.g. Si$_3$N$_4$) and/or Oxide (e.g. Y$_2$O$_3$.) |
|---|---|---|---|---|---|---|---|---|---|---|---|---|---|---|---|---|---|
| Bal. | 6.5 | 4.6 | 1.1 | 4 | 7.6 | 6.4 | 5 | — | — | 5.9 | — | — | 0.1 | — | — | — | 3 |
| Bal. | 9.5 | 8.4 | 0.5 | 9.5 | 3 | — | — | — | 0.75 | 5.5 | 0.2 | 0.05 | 1.5 | 0.015 | 0.013 | 0.06 | 1 |
| Bal. | 11.75 | 6.8 | 1.5 | 4.9 | 6.35 | 2.8 | — | 0.1 | 0.02 | 6.15 | 0.2 | 0.07 | 1.5 | 0.015 | 0.03 | 0.06 | 1 |
| Bal. | 9.5 | 8.4 | 0.5 | 9.5 | 3 | — | — | — | 0.75 | 5.5 | 0.2 | 0.05 | 1.5 | 0.015 | 0.013 | 0.06 | 0.5 |
| — | — | — | Bal | — | — | — | — | — | 0.5 | — | — | — | — | — | 0.1 | — | 0.5 |
| — | — | — | Bal | — | — | — | — | — | 0.5 | — | — | — | — | — | 0.1 | — | 48 |
| — | — | — | Bal | — | — | — | — | 1 | — | — | — | — | — | — | — | 36 | 0.5 |
| — | — | — | Bal | — | — | — | — | 1 | — | — | — | — | — | — | — | 36 | 48 |
| — | — | 2 | — | — | — | — | — | Bal | 25 | 2 | — | — | 8 | — | — | 16 | 1 |
| — | — | — | — | 10 | — | — | — | Bal | — | — | — | — | — | — | 2.5 | — | 1 |
| — | — | — | Bal | — | — | — | — | — | 0.5 | — | — | — | — | — | 0.1 | — | 1 |
| — | — | — | — | 10 | Bal | — | — | — | — | — | — | — | — | — | — | — | 1 |
| — | — | — | — | Bal | — | — | — | — | — | — | — | — | — | — | — | — | 1 |
| — | — | — | — | Bal | — | 5 | — | — | — | — | — | — | 0.5 | — | — | — | 1 |
| — | — | — | — | Bal | — | 24 | — | — | — | — | — | — | 0.5 | — | — | — | 1 |

The turbomachine component manufactured by additive manufacturing as disclosed so far can be subjected to one or more additional process steps. According to some embodiments, a final hot isostatic pressing (HIP) step can be performed for removing or reducing the porosity inside the melted and solidified material. The hot isostatic pressing step or treatment can be performed e.g. in an atmosphere of inert gas under pressures between about 80 and about 200 MPa.

According to some embodiments the turbomachine component is subjected to subsequent heat treatments under vacuum aimed at achieving desired material properties, e.g. at homogenizing the microstructure and subsequent aging the material to obtain precipitation hardening strengthening for the precipitation hardening superalloys (i.e. gamma prime former). Localized (in specific component areas) homogenization and heat treatment can be applied to locally increase the grain size to maximize coarse grain size properties in specific areas (typically the airfoil areas of gas turbine buckets).

FIG. 2 illustrates a summarizing flow chart of exemplary embodiments of the method as disclosed above.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A method for manufacturing a component made of a metal-based material, the method comprising:
    forming a metal-containing powder material by atomizing molten portions of an ingot of a master superalloy via plasma atomization, the ingot formed by vacuum induction melting;
    forming the component by an additive manufacturing process from a powder blend comprising the metal-containing powder material and at least one strengthening dispersor, wherein the strengthening dispersor has an average grain size equal to or less than about 5 micrometers and less than an average grain size of the metal-containing powder material,
    wherein the powder blend comprises between 0.1% to 2% by weight of the at least one strengthening dispersor, the at least one strengthening dispersor being in powder form and including an oxide material and a ceramic non-oxide material.

2. The method of claim 1, wherein the additive manufacturing process is selected from the group consisting of: electron beam melting (EBM), selective laser melting (SLM), selective laser sintering (SLS), laser metal forming (LMF), direct metal laser sintering (DMLS), and direct metal laser melting (DMLM).

3. The method of claim 1, wherein the at least one strengthening dispersor in powder form has an average grain size equal to or less than about 0.1 micrometers.

4. The method of claim 1, wherein the strengthening dispersor in powder form has an average grain size equal to or greater than about 5 nm.

5. The method of claim 1, wherein the at least one strengthening dispersor in powder form has a nanometric average grain size.

6. The method of claim 1, wherein the metal-containing powder material has an average grain size between about 10 micrometers and about 100 micrometers.

7. The method of claim 1, wherein the strengthening dispersor in powder form is an atomized powder.

8. The method of claim 1, wherein the oxide material is selected from the group consisting of: Y$_2$O$_3$, Al$_2$O$_3$, Th$_2$O$_4$, Zr$_2$O$_3$, La$_2$O$_3$, Yb$_2$O$_3$, Dy$_2$O$_3$, and wherein the ceramic non-oxide material is selected from the group consisting of: Si$_3$N$_4$, AN, SiC, TaC, WC, and combinations thereof.

9. The method of claim 1, wherein the metal-containing powder material is selected from the group consisting of: Ni-based superalloys, Co-based superalloys, Fe-based superalloys, Mo-based superalloys, W-based superalloys, Ta-based superalloys; Nb-based superalloys, and combinations thereof.

10. The method of claim 1, wherein the method further comprises forming the powder blend by at least:
    producing the metal-containing powder material with a first average grain size;

producing the at least one strengthening dispersor in powder form with a second average grain size, wherein the second average grain size is lower than the first average grain size; and mixing together the metal-containing powder material and the strengthening dispersor in powder form to obtain the powder blend.

11. The method of claim 1, further comprising at least one heat-treatment step performed on the formed component.

12. The method of claim 11, wherein the at least one heat-treatment step is performed under vacuum.

13. The method of claim 1, wherein the component is a turbomachine component.

* * * * *